US010628903B2

(12) United States Patent
Levi

(10) Patent No.: US 10,628,903 B2
(45) Date of Patent: Apr. 21, 2020

(54) NETWORK COMPUTER SYSTEM TO IMPLEMENT COUNTER VALUES FOR ARRANGING SERVICES

(71) Applicant: Uber Technologies, Inc., San Francisco, CA (US)

(72) Inventor: Dor Levi, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 464 days.

(21) Appl. No.: 15/601,507

(22) Filed: May 22, 2017

(65) Prior Publication Data

US 2018/0336653 A1 Nov. 22, 2018

(51) Int. Cl.
*G06Q 50/30* (2012.01)
*G06Q 30/02* (2012.01)

(52) U.S. Cl.
CPC ......... *G06Q 50/30* (2013.01); *G06Q 30/0284* (2013.01)

(58) Field of Classification Search
CPC ..... G06Q 50/30; G06Q 10/00; G06Q 30/0284
See application file for complete search history.

(56) References Cited

U.S. PATENT DOCUMENTS

| 2003/0187720 | A1 | 10/2003 | Takada | |
|---|---|---|---|---|
| 2005/0234772 | A1* | 10/2005 | Haruki | G06Q 30/0231 705/14.31 |
| 2010/0161392 | A1* | 6/2010 | Ashby | G06Q 30/02 705/13 |
| 2011/0029658 | A1 | 2/2011 | Werth | |
| 2011/0307282 | A1 | 12/2011 | Camp | |
| 2012/0041675 | A1 | 2/2012 | Juliver | |
| 2013/0085819 | A1* | 4/2013 | Gore | G06Q 40/08 705/14.1 |
| 2014/0011522 | A1 | 1/2014 | Lin | |
| 2014/0229255 | A1* | 8/2014 | Scofield | G06Q 30/0207 705/14.21 |
| 2015/0081362 | A1 | 3/2015 | Chadwick | |

(Continued)

FOREIGN PATENT DOCUMENTS

| CN | 106127329 | 11/2016 |
|---|---|---|
| CN | 106529703 | 3/2017 |
| WO | WO 2017/0016517 | 2/2017 |

OTHER PUBLICATIONS

Singer, Natasha, and Mike Isaac. "An App That Helps Drivers Earn the Most From Their Trips." The New York Times, The New York Times, May 9, 2015, https://www.nytimes.com/2015/05/10/technology/a-dashboard-management-consultant.html. (Year: 2015).*

(Continued)

*Primary Examiner* — Daniel Vetter
*Assistant Examiner* — Manal A. Alsamiri
(74) *Attorney, Agent, or Firm* — Mahamedi IP Law LLP

(57) ABSTRACT

A computer system operates to monitor an activity of a service provider to detect a first milestone that coincides with a service state of the service provider being changed to an unmatched state. The computer system tallies a value of a counter over a time interval during which the service provider is in an unmatched state. The computer system determines a credit value for the service provider based on at least one of the tallied value or a value associated with a detected tally milestone.

24 Claims, 10 Drawing Sheets

(56) References Cited

U.S. PATENT DOCUMENTS

| | | |
|---|---|---|
| 2015/0161563 A1 | 6/2015 | Mehrabi |
| 2015/0161564 A1 | 6/2015 | Sweeney |
| 2015/0206267 A1 | 7/2015 | Khanna |
| 2016/0247247 A1* | 8/2016 | Scicluna ............... G06Q 10/02 |
| 2016/0335576 A1 | 11/2016 | Peng |
| 2017/0011324 A1 | 1/2017 | Truong |
| 2017/0116566 A1 | 4/2017 | Walton |
| 2017/0193625 A1 | 7/2017 | Fan |
| 2017/0220966 A1 | 8/2017 | Wang |
| 2017/0227370 A1 | 8/2017 | O'Mahony |
| 2017/0323244 A1* | 11/2017 | Rani ............... G06Q 10/06393 |
| 2018/0060990 A1 | 3/2018 | Liu |
| 2018/0330621 A1 | 11/2018 | Kuncl |
| 2019/0095965 A1 | 3/2019 | Stayner |

OTHER PUBLICATIONS

ISR and Written Opinion dated Aug. 27, 2018 in PCT/US2018/032360.
Written Opinion of IPEA dated May 3, 2018 in PCT/US2018/032360.
ISR and Written Opinion dated Aug. 1, 2018 in PCT/US2018/0033863.
IPRP in PCT/US2018/032360 dated Jul. 23, 2019.
IPRP in PCT/2018/033863 dated Aug. 26, 2019.
ISR issued in PCT/US2018/052963 dated Jan. 14, 2019.

* cited by examiner

NETWORK COMPUTER SYSTEM TO IMPLEMENT COUNTER VALUES FOR ARRANGING SERVICES

BACKGROUND

Network computer systems exist to provide various types of services using mobile devices. The services are sometimes de-centralized or distributed, causing inefficiencies to occur with respect to the use of resources, including computing resources.

Figure 1:
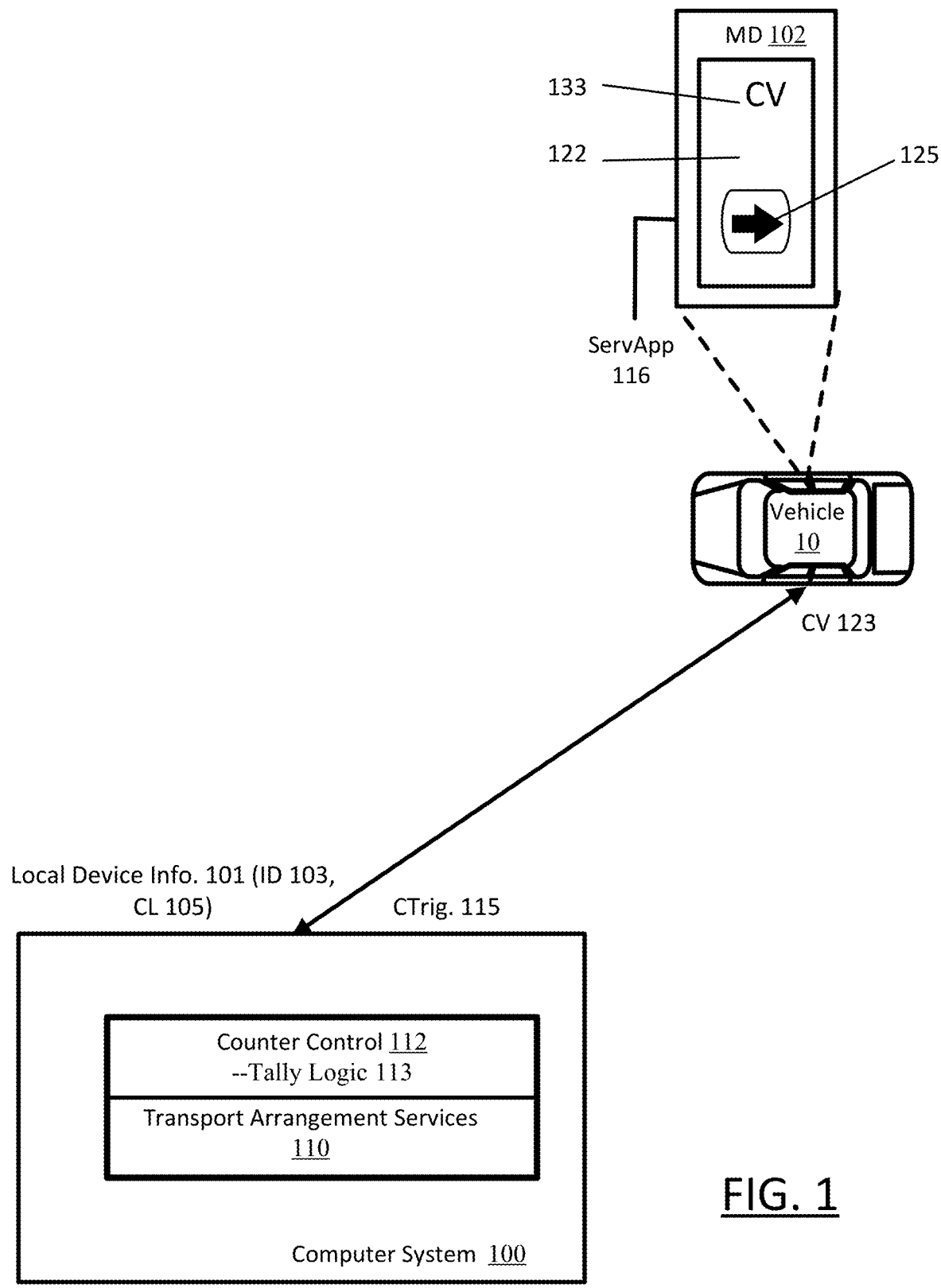
FIG. 1 illustrates an example computer system for providing transport arrangement services.

Throughout the drawings, identical reference numbers designate similar, but not necessarily identical elements. The figures are not necessarily to scale, and the size of some parts may be exaggerated to more clearly illustrate the example shown. Moreover the drawings provide examples and/or implementations consistent with the description. However, the description is not limited to the examples and/or implementations provided in the drawings.

DETAILED DESCRIPTION

A computer system operates to monitor an activity of a service provider to detect a first milestone that coincides with a service state of the service provider being changed to an unmatched state. The computer system tallies a value of a counter over a time interval during which the service provider is in an unmatched state. Additionally, the computer system determines a credit value for the service provider based on at least one of the tallied value or a value associated with a detected tally milestone.

According to some examples, a computer system operates to determine a provisioning level for a service provided by a projected quantity of service vehicles in each of multiple subregions of the geographic region. The computer system determines a tally rate for each of the multiple subregions based on the provisioning level determined for that subregion. The computer system provides a set of markers to at least a first service vehicle in order to indicate the tally rate for each of the multiple subregions. As the service provider operates a service vehicle, the computer system calculates a value of a counter for the given service vehicle based on the tally rate, where the tally rate is variable based on a location of the vehicle as the vehicle travels through one or more of the subregions.

Among other benefits, examples promote service providers in remaining online and available for use for a suitable duration of time. Under conventional approaches, for example, a service provider may change his service status to be offline several times over a set of working hours. Examples recognize that many inefficiencies exist with service providers switching to offline status for short periods of time. Among the inefficiencies, a service arrangement system which is implemented on a network computer system expends additional resources to bring service providers online. For example, a network computer system for arranging transport-related services may have to perform an initial handshake with a mobile device of the service provider when the service provider comes online. The network computer system may also have to retrieve account and profile information for the service provider, and update data stores used by the computer system to account for the service provider. Additionally, the determination of provisioning levels for subregions can become less accurate because the service provider's actions in switching offline and then online are inherently unpredictable.

To address these and other inefficiencies, examples described provide for a network computer system to manage a counter value, which can also be provided to service providers as a user-interface feature. The counter value provides an incentive for service providers to remain online for continuous time periods (e.g., in between times when service providers are assigned to service requests). By promoting continuity with respect to the online status of service providers, a network computer system on which transport arrangement services are implemented can mitigate inefficiencies associated with bringing service providers online. Additionally, the network computer system is able to better determine and manage provisioning levels over a given geographic region.

As used herein, a client device, a computing device, and/or a mobile computing device refer to devices corresponding to desktop computers, cellular devices or smartphones, laptop computers, tablet devices, etc., that can provide network connectivity and processing resources for communicating with a service arrangement system over one or more networks. In another example, a computing device can correspond to an in-vehicle computing device, such as an on-board computer. Also, as described herein, a user can correspond to a requester of a network service (e.g., a rider) or a service provider (e.g., a driver of a vehicle) that provides location-based services for requesters.

Still further, examples described relate to a variety of location-based (and/or on-demand) services, such as a transport service, a food truck service, a delivery service, an entertainment service, etc., to be arranged between requesters and service providers. In other examples, the system can be implemented by any entity that provides goods or services for purchase through the use of computing devices and network(s). For the purpose of simplicity, in examples described, the service arrangement system can correspond to a transport arrangement system that arranges transport and/or delivery services to be provided for riders by drivers of vehicles who operate service applications on respective computing devices.

One or more examples described provide that methods, techniques, and actions performed by a computing device are performed programmatically, or as a computer-implemented method. Programmatically, as used, means through the use of code or computer-executable instructions. These instructions can be stored in one or more memory resources of the computing device. A programmatically performed step may or may not be automatic.

One or more examples described can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs, or machines.

Some examples described can generally require the use of computing devices, including processing and memory resources. For example, one or more examples described may be implemented, in whole or in part, on computing devices such as servers, desktop computers, cellular or smartphones, and tablet devices. Memory, processing, and network resources may all be used in connection with the establishment, use, or performance of any example described herein (including with the performance of any method or with the implementation of any system).

Furthermore, one or more examples described may be implemented through the use of instructions that are executable by one or more processors. These instructions may be carried on a computer-readable medium. Machines shown or described with figures below provide examples of processing resources and computer-readable mediums on which instructions for implementing examples described can be carried and/or executed. In particular, the numerous machines shown with examples described include processor (s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer programs, or a computer usable carrier medium capable of carrying such a program.

System Description

FIG. 1 illustrates an example computer system for providing transport arrangement services. As described with various examples, a network computer system 100 provides transport arrangement services 110 in order to match service providers with requests for such services. As described in greater detail, the transport arrangement services 110 are implemented to include a counter control logic 112, which tallies a counter value 123 for service providers in connection with activities the service providers can perform when in an unmatched (e.g., off-trip) state. In an unmatched state, the service provider may operate the vehicle without obligation to perform activities that are in furtherance of a service request (such as travel to a service direction).

The computer system 100 may be implemented as a network service, or combination of servers, which combine to provide functionality for the transport arrangement services 110. In some examples, the computer system 100 is implemented using mobile devices of users, including service providers and requesters, with the individual devices executing a corresponding service application that causes the computing device to operate as an information inlet and/or outlet for the computing system 100.

In an example of FIG. 1, mobile device 102 and vehicle 10 are representative of mobile devices and vehicles used by service providers in providing transport-related services within a geographic region. The mobile device 102 can, for example, correspond to a wireless telephony/messaging device, such as provided by a "smartphone", "feature phone" or other multi-functional device. In variations, the mobile device 102 can correspond to a tablet, notebook, laptop, wearable device or other similar device. Still further, the mobile device 102 may correspond to a computing device that is integrated with the vehicle 10, such as a dashboard computer. The mobile device 102 may be provided with a service application 116 or program, which the computer system 100 can use to establish communications with the mobile device 102. The computer system 100 may use the service application 116 to extend functionality and features of the transport arrangement services 110 to the mobile device 102 of the service provider.

The service provider can operate the vehicle 10 to provide transport services, including transport of persons between locations of a geographic region. In variations, the vehicle 10 may be used for services such as shipping, package delivery, food delivery or the like. The computer system 100 may monitor the vehicle 10 by communicating with the mobile device 102 of the service provider. In implementation, the service provider may launch the service application 116 once the service provider is ready to receive and fulfill service requests. The service application 116 may execute on the mobile device 102 to perform operations which include communicating with a network location of the computer system 100. Additionally, the service application 116 may operate to interface with local resources (e.g., GPS, sensors) and network resources (e.g., social network) of the mobile device 102 to provide the computer system 100 with local device information. The local device information 101 may include an account identifier 103 (e.g., for the service provider) for the service provider, as well as a current location 105 of the mobile device 102.

According to some examples, computer system 100 implements transport arrangement services 110 to match service vehicles with incoming service requests. Each service request may specify one or more service locations, such as a service start or destination. The computer system 100 may match service vehicles to service requests based on factors that include proximity of the service vehicles with the start locations of the respective service requests.

In some examples, the service provider may be associated with any one of multiple predefined service states, including (i) an offline state, (ii) an unmatched state in which the service provider is not obligated to operate the service vehicle in furtherance of a service request, and (iii) a matched state, where the service provider's action are in furtherance of fulfilling a service request (e.g., driving towards service location or initiating service at start location). In the offline state, the mobile device 102 may operate without ability to receive or accept service requests from the computer system 100. The service application 116 may include functionality (e.g., user interface feature) to enable the service provider to specify their state as offline. In variations, the offline state may be triggered when the service application 116 is closed, or when the mobile device 102 is turned off. When the service provider is online, the service provider may be associated with one of multiple possible online states, including the unmatched state, which may coincide with the service provider waiting to be matched to a service request. In the matched state, the service provider may be matched to a service request, so that the service provider is obligated to, for example, transport a requester or travel to a service location. The computer system 100 may track a service state of the service provider when matching the service provider to a service request. The computer system 100 may also tracking the service provider until the service request is completed or terminated.

The counter control logic 112 can implement logic to tally a counter value 123 for the service provider based on a set of tallying rules or logic 113 and a set of counter triggers 115. In one implementation, the counter control logic 112 initiates the counter value 123 from an initial value in response to detection of a first counter trigger 115. The first counter trigger 115 may coincide or otherwise be linked or associated to an event of the service provider entering the unmatched state. For example, the first counter trigger 115 may occur shortly after the service provider opens the service application 116, or after the service provider is detected as completing a service request. The counter control logic 112 tallies the counter value 123 for an interval that extends until another counter trigger 115 is detected, such as by the service provider transitioning or otherwise switching out of the unmatched service state. While the counter value 123 is being tallied, the updated counter value may be transmitted to the mobile device 102 of the service provider. Alternatively, the service application 116 may implement some or all of the functionality of the counter control logic 112, so as to tally counter value 123 locally on the mobile device 102. Still further, the counter control logic 112 and the service application 116 may each calculate the counter value 123 using, for example, a common set of rules or other logic, such that the counter value 123 is substantially synchronized as calculated by the computer system 100 and the mobile device 102.

The counter control logic 112 may tally the counter based on an increment value which is added to an initial value upon the occurrence of an event or condition (e.g., passage of time, traversal of distance) to yield a current counter value. An increment value may be repeatedly added to the current value with further occurrences of the event or condition. A tally rate, corresponding to an increment and/or frequency at which the increment is added, may be variable, and determined by implementation of the tally logic 113. The tally logic 113 may set a range of possible increment values, as well as a frequency in which the increment values are to be added to the current tally value. The tally logic 113 may also set the tally rate to increase or decrease based on other metrics. For example, the tally rate may increase in relation to a length of time during which the service provider is online. In such an example, the tally rate may encourage service providers from going off-line to do other activities. At the same time, the counter control logic 112 can also monitor to ensure service providers do not stay online, beyond a time interval which would be considered unsafe or unhealthy.

In an example, the service application 116 generates a user interface 122 on the mobile device 102. The user interface 122 displays a feature 133 corresponding to the counter value 123. When the user performs an action to, for example, switch into a matched state (e.g., service provider accepts service request, service provider starts service, etc.), the counter value is converted into a credit which is provided in the account of the service provider. In some examples, the counter value 123 may be calibrated to currency, which is deposited in an account of the service provider once the service provider performs an action that coincides with the service provider changing to a matched state and/or fulfilling a service request of the matched state. Additionally, in some examples, when the user goes offline, the counter value 123 may reset to an initial value (e.g., zero).

In some examples, the counter control logic 112 may be used to influence service providers to perform certain actions, such as to operate service vehicles to move towards a target direction or area. The transport arrangement service 110 may use information obtained from service providers and requesters to determine a provisioning level for multiple subregions of a given geographic region in which the service provider operates in. The provisioning level may be determined as a real-time estimate, or as a forecast for a future time interval. By determining the provisioning level, the computer system 100 can identify subregions and areas where service providers are oversupplied or undersupplied. Based on such determinations, the counter control logic 112 can identify target areas which are undersupplied, as well as avoidance areas which are oversupplied.

According to some examples, the transport arrangement services 110 can implement operations to reposition the service provider when the service provider is in the unmatched state. The counter control logic 112 may provide the mobile device 102 with directional or geographic information that can render as a directional feature 125 or other visual alerts (e.g., color coded map content). The directional feature 125 can indicate a direction of travel for the service provider, coinciding with a location where the tally rate of the counter value 123 is higher. In variations, the user interface 122 may indicate a relative tally value for the counter value using color/shading coding of map content, or other visual indicia.

Service Arrangement System

Figure 2:
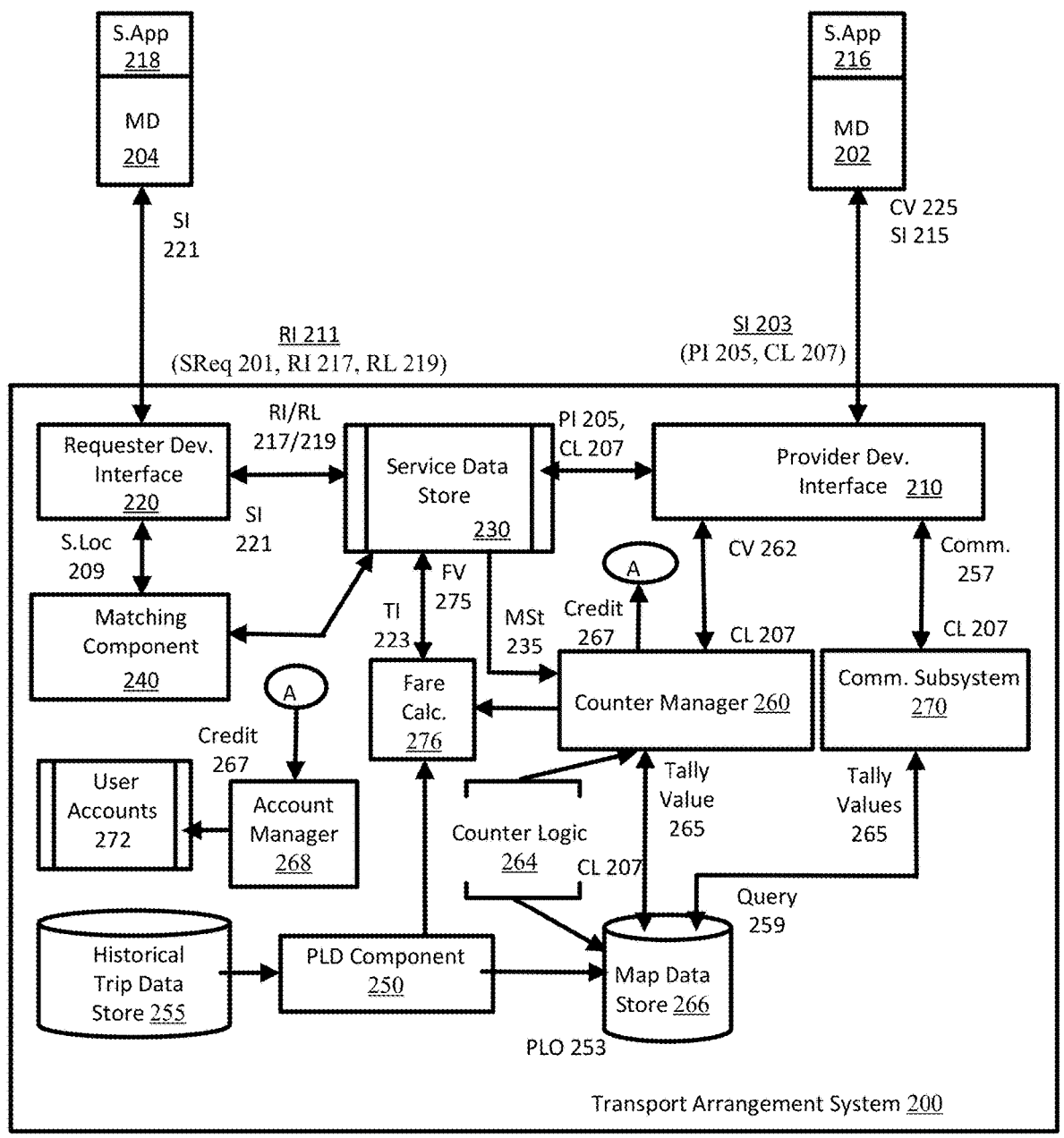
FIG. 2 illustrates an example of a service arrangement system to manage positioning of service providers in a geographic region.

FIG. 2 illustrates an example of a service arrangement system to manage positioning of service providers in a geographic region. According to examples, a service arrangement system 200 may be implemented as a network service, using, for example, a network computer system 100 such as described with an example of FIG. 1. In some examples, the system 200 implements a network platform, in connection with applications that run on mobile devices of the population of users. For a given geographic region, the users can include operators (or "service providers") of service vehicles, as well as requesters who receive a transport-related service.

With reference to FIG. 2, system 200 includes a provider device interface 210, a requester device interface 220, a service data store 230 and a service matching component 240. The provider device interface 210 includes or performs processes that run on the network-side of the system 200 to establish communication channels with individual devices of service providers. For example, the provider device interface 210 can establish secure sockets with different types of mobile devices, which service providers of the system 200 can utilize when providing services using their respective vehicles. In some examples, the service providers operate mobile devices (represented in FIG. 2 by the mobile device 202) on which a corresponding service application 216 runs. Among other functionality, the service application 216 can (i) automate operations which include indicating the availability of the service provider to provide service, (ii) communicate location information to enable the system 200 to monitor the location of the service provider's vehicle, (iii) receive information from the system 200 for facilitating the service provider to receive and fulfill service requests, and (iv) communicate information to the system 200 for various purposes, including provisioning determination. Additionally, as described with various examples, the service application 216 can display service information 215 to the service provider. The service information 215 can include information to enable the service provider to navigate towards subregions where more service requests are likely to be received. Additionally, the service information can enable rendering of a counter value 275 that tallies value for the service provider's account when the service provider is between service requests (e.g., in the unmatched state).

The requester device interface 220 can implement processes that run on the network-side of the system 200 to establish communication channels with individual devices of requesters. The requesters may also operate mobile devices (represented in FIG. 2 by the mobile device 204) on which a corresponding service application 218 runs. The requesters may operate respective service applications 218 to request transport-related services, such as human transport between a start location (or pickup location) and a destination (or drop-off). In variations, the types of services which may be arranged through the system 200 may include human transport, deliveries, shipping, and delivery of on-demand services (e.g., food trucks). The service application 218 may also provide information for use in enabling the system 200 to determine provisioning levels. For example, the service application 218 may communicate with the system 200 when the requester first opens the application, but before the service requester makes a request for service.

In some examples, the provider device interface 210 and the requester device interface 220 can each include or use an application programming interface (API), such as an externally provider-facing API, to communicate data with the provider and requester devices 202, 204, respectively. By providing the externally facing API, the system 200 can establish secure communication channels via secure access channels over the network through any number of methods, such as web-based forms, programmatic access via RESTful APIs, Simple Object Access Protocol (SOAP), remote procedure call (RPC), scripting access, etc.

According to some examples, the provider device 202 initiates communications with the system 200 using the service application 216. The service application 216 may correspond to a program (e.g., a set of instructions or code) that is downloaded and stored on the mobile device 202 of the service provider. The service provider can launch the service application 216 in order to utilize the system 200 to receive service requests, and the service provider may operate a service vehicle to fulfill assigned service requests. Once the communication channel is established, the provider device 202 may repeatedly or continuously communicate service information 203 to the system 200. The service information 203 may include the provider's identifier 205, and the provider's current location 207, which may be determined by the service application interfacing with a GPS component of the provider device 202.

The service data store 230 maintains a record that is associated with the identifier 205 of each active service provider. The record may also maintain information that includes the current location 207 of the service provider. By way of example, each service provider may start a shift by operating the service application 216 (e.g., opening the application on the provider's device 202), and then toggling a state feature provided by the service application 216 to 'on duty'. The service application 216 communicates the activation of the state feature to the system 200 via the provider device interface 210. The provider device interface 210 processes the service information 203 received from individual service providers. For each service provider, the provider device interface 210 extracts the current location 207 and stores the current location with the provider's identifier 205 in the data service store 230. As the service provider's location changes (e.g., with movement of the service provider's vehicle), subsequent communications from the provider via the provider device interface 210 can be used to update the service data store 230. In this way, the service data store may reflect the most current location of each service provider.

The service data store 230 may also associate a service state with each provider. Initially, when the service provider goes on duty, the service provider may be associated with unmatched state. Once the service provider is matched to a service request, the associated state of the service provider may change, to reflect, for example, one more in-trip states (e.g., on-trip, on-route to service start position, etc.).

The requester device interface 220 receives requester information 211 from multiple requesters. The requester information 211 can identify the requester (e.g., by account), as well as provide the current location 219 of the requester. The requester information 211 can be communicated with a service request 201. In some variations, at least some of the requester information 211 (e.g., current location) may be communicated before the service request 201 is communicated. The requester device interface 220 can parse individual service requests 201 to determine one or more service locations 209 of the service request, including the service start location and/or the service destination location.

In some examples, the service data store 230 can maintain status records for the individual requesters, with each record matching the current location 219 of the requester's device 204 with the requester's identifier 217. The service data store 230 may also reflect a status of the requester. For example, the requester status may reflect whether (i) the requester has opened the service application 218, but has not yet made a service request 201, (ii) the requester has made a service request 201 which is currently unmatched to a service provider, (iii) the requester has made a service request which is matched to a service provider, but service has not yet initiated for the requester (e.g., service provider is on-route to pick up the requester), (iv) the requester is currently receiving service (e.g., requester is inside the vehicle), or (v) requester has received service.

According to some examples, the requester is provided service information 221 when the requester opens the service application 218. The service information 221 may provide information such as whether the requester's service request has been matched, current location of matched service provider, trip progress, estimated time of arrival, etc. The service information 221 may also include a determined fare value 275 for a planned, in-progress, or completed service request. A fare calculation component 276 can determine the fare value 275 for a planned, requested or completed trip, based on, for example, the start and destination locations of the service request. In this way, the fare value 275 can be based on parameters determined from trip information 223 and/or the service locations 209 specified with the service request 201. The fare calculation component 276 can determine the fare value 275 based on a projected or measured distance and/or time of travel. In variations such as described below, the fare calculation component 276 can factor for provisioning levels and other considerations when determining the fare value 275.

In one implementation, the matching component 240 receives the service request 201 and uses the service data store 230 to match the incoming service request with an available (e.g., unmatched) service provider. In one implementation, the matching component 240 references the service location(s) 209 of the incoming service request 201 with the current location of available service providers, as provided by the service data store 230. In one example, that matching component 240 queries the service data store 230 for service providers that are within a first threshold distance (alternatively, within a threshold time of travel). From the queried result set, the matching component 240 makes a selection of a service provider for the service request 201. In some examples, a selected service provider receives a matched service request as an invitation. Alternatively, the matched service request may be communicated as an automatic assignment to the selected service provider.

According to some examples, the service data store 230 also tracks and records a service state of the service provider. Once the service provider is matched to a service request, the matching component 240 can change a service state associated with the selected service provider in the service data store 230. For example, a service state of the service provider can be changed from an unmatched state to a matched state. Depending on implementation, multiple additional states may be defined for use with service providers of system 200. According to some examples, the service state of the service provider may include an offline state (e.g., off-duty), an unmatched and a matched state. In the unmatched state, the service provider is not assigned to a service request, and the service provider may freely operate the service vehicle without obligation to an assigned service request. This may coincide with time intervals during which the service provider is active and without a matched service request, (e.g., time interval immediately following the service provider coming online or completing a service request). In the matched state, the service provider is assigned to a service request, and may operate the service vehicle in furtherance of the service request (e.g., travel to a service location).

In some examples, additional service states may be defined for service providers. For example, the matched state may include one or more transitional states, such as an on-route state (e.g., service provider is assigned and on-route to the service location) and an end-trip state (e.g., service provider is within a threshold distance of the destination for an assigned service request). Once the requester enters the service vehicle, the service state of the service provider may change from the on-route state to an on-trip state to reflect that the service has initiated.

Depending on implementation, various conditions may be used to detect the service state of the service provider. By way of examples, the unmatched state may be detected automatically for a duration that follows the service provider coming on, and before the service provider is assigned to a service request. When the matching component 240 assigns a service request to a service provider, the matching component 240 may monitor the service data store 230 to detect an indicator of the service provider accepting the service request. The matching component 240 may, for example, monitor the updated current location 207 of the service provider in the service data store 230. In variations, the service application 216 may prompt the service provider to accept a service request, and the service provider's input may be recorded in the service data store 230 via the provider device interface 210. Likewise, to detect or confirm the on-trip state, the requester information 211 can be monitored to detect when the current location 219 of the requester device 204 is approximately the same as that of the service provider device 202, while the vehicle of the service providers in motion. The service state of the service provider can be used to determine when the service provider is available for matching to new incoming service requests. For example, once the service state of the service provider is changed to an on-route state, the service provider may be excluded from possible selection until another event occurs to change the service state again. For example, the current trip for the service provider may complete, or the system 200 may detect when the service vehicle is nearing the destination, such that the service provider can be marked available for assignment to a new service request.

Additionally, the service state of the service provider can be used to trigger and tally a counter value for the service provider. For individual service providers, the counter manager 260 may monitor the service data store 230 for one or more milestones 235 (e.g., a predetermined change to the service state of the service provider). As described with other examples, the counter manager 260 can maintain one or multiple processes ("counters") by which a counter value 262 is tallied. The counter manager may associate each counter with multiple milestones, including a first milestone which initiates the counter, and second milestone which pauses, terminates or completes the counter. In one example, the detection of a first milestone 235 can trigger the counter manager 260 to start a counter value 262 for the service provider. For example, the counter manager 260 can initiate tallying the counter value 262 in response to the service state of the provider changing to an unmatched state. The milestone 235 may coincide with, for example, the service provider going online (from offline), or the service provider completing a service request. In some examples, the counter manager tallies the counter value 262 by starting the counter at an initial value (e.g., upon detecting the start trigger for the counter value) and then incrementing the counter value 262 based on predefined events or conditions, including the passage of time (e.g., duration while the service provider is in the unmatched state). The counter manager 260 may utilize counter logic 264 to define rules and settings for how the counter value 262 is to be tallied. The counter logic 264 can determine the increment for the counter value 262, as well as the conditions or events that trigger incrementing the counter value 262.

The counter logic 264 can also implement one or more rules that set the counter value 262 to a designated amount, or alternatively, increment (or decrement) the counter value 262 by a designated amount. In some variations, the counter logic 264 can implement a rule to initialize the counter value 262 (e.g., to null value), upon the occurrence of a predetermined event or condition. The counter logic 264 can also provide that the counter value is reset upon the service provider going offline. In one implementation, the counter manager 260 may implement the counter logic 264 to reset the counter value 262 upon the occurrence of a milestone, such as the service provider going offline, the service provider completing a service request, consecutive service requests, or multiple service requests within a certain time period.

The counter logic 264 can pre-define multiple milestones 235 that trigger the counter manager 260 to initiate, interrupt, terminate without completion, or complete the tallying of a corresponding counter value 262. In variations, the milestone 235 can predefine an event or condition to cause the counter manager 260 to adjust the tally rate, or to add a flat value to the existing counter value 262. The counter logic 262 may define individual milestones 235 to correspond to the occurrence of a predefined condition or event (or series thereof). In some examples, once a counter is initiated by a first milestone 235, one of multiple possible second milestones 235 may cause the counter manager 260 to (i) interrupt or pause the tallying of the counter value, (ii) terminate the counter value 262 by resetting the counter value 262 without crediting the service provider, (iii) designate a specific counter value 262 independent of tallying by increment, or (iv) complete the counter value 262 by conversion to an account credit 267.

In some examples, the counter manager 260 detects a change in the service state of the service provider, and the event may be interpreted as one of the second milestones to terminate, interrupt or complete the tallying of the counter value 262. By way of examples, the counter manager 260 may pause or complete the tallying of the counter value 262 when the service provider is assigned to a service request (e.g., service provider is automatically matched to a service request, or is matched and then accepts the service request). This second milestone 235 may correspond to the provider's service state changing from an unmatched state to an assigned or on-route (to service location) state. In such an example, the counter logic 264 can use the second milestones 235 to determine whether and when the counter value 262 is resumed, terminated (e.g., reset) or completed. For example, if the service provider completes the service request (e.g., transports the requester to a destination), the provider's service state may change again, and this event may trigger the counter manager 260 to convert the tallied counter value 262 into a credit 267. If, however, the service provider rejects the transport request, the counter value 262 may remain paused, or alternatively, may be reset.

Likewise, another one of the second milestones may correspond to the service provider going offline. Should this second milestone occur before another of the second milestones, the counter manager 260 may be reset the counter value 262.

In some examples, the counter manager 260 may also monitor the service data store 230 to detect the milestone corresponding to the service provider being deemed to have completed a service request. Alternatively, the milestone for completing the counter value 262 may correspond to the service provider completing consecutive service requests, or multiple service requests within a certain time period. When a milestone for completing the counter value 262 is detected, the counter manager 260 may apply the credit 267 to an account of the service provider, with the value of the credit being based on the counter value 262.

Still further, in some examples, the counter logic 264 can determine a limit for the counter value 262. For example, the milestone can correspond to the counter value 262 reaching a predetermined threshold. For example, the counter manager 260 can stop (or pause) the counter value 262 when the counter value 262 reaches a predetermined value (e.g., $5.00). In variations, the counter logic 264 may apply rules and settings to determine the counter limit for individual service providers. For example, the counter logic 264 may provide for the limit of the counter value 262 to be greater based on a length of the continuous time interval in which the service provider is online. Alternatively, the counter value 264 can provide for the limit of the counter value 262 to increase in relation to a number of transport requests the service provider completes consecutively, and/or in a given duration of time. Still further, other events, such as the service provider switching offline may correspond to a milestone in which the counter value is reset when the service provider returns online.

In some variations, the counter logic 264 can also implement one or more rules as to how and when the counter value 262 is converted into the account credit 267. In one implementation, the counter manager 260 converts the counter value 262 to a credit 267 (e.g., based on a predetermined conversion rate). An account manager 268 can perform operations of accessing user accounts 272, and applying the credit 267 to the service provider's account. The milestone for triggering conversion of the counter value 262 to credit 267 may be tied to a condition or event, such as (i) the service state of the provider changing to a matched state, (ii) the service provider completing a service request, (iii) the service provider completing a threshold number of consecutive service requests, or (iv) the service provider completing multiple service requests within a certain time period. Still further, in some examples, the counter manager 260 can initialize the counter value 262 without conversion upon the occurrence of another milestone, correspond to a predefined event or condition. For example, the counter value 262 may be initialized if the service provider goes offline.

According to some examples, the system 200 includes a provisioning level determination component ("PLD component") 250 that determines a provisioning level for multiple sub-regions of a given geographic region. In particular, the PLD component 250 determines a provisioning level output 253 that reflects a comparative measure of service providers and requesters. The provisioning level output 253 can reflect a provisioning level for each of multiple subregions as either a current (e.g., real-time) determination, or as a forecasted determination for a future time interval. In some examples, the provisioning level output 253 may be based on a ratio of service providers to requesters, and more particularly, as a ratio of available service providers to requesters who have open requests and/or potential requesters who have opened the service application but have not submitted a service request. In determining the provisioning level output 253, the PLD component 250 may estimate or forecast the service providers to include any one or more of an estimate of available service providers (e.g., having an unmatched service state), service providers who are on-route to a service location, service providers who are on-trip (or otherwise in a matched state), service providers who are nearing a trip end and can be re-assigned, and/or service providers who are on-trip and are available for further assignment. Likewise, the PLD component 250 may estimate or forecast the requesters to include requesters who have open and unassigned requests, requesters who are being serviced, requesters who have assigned service requests and/or waiting for an assigned service provider, and/or potential requesters (e.g., those users who have opened the service application 218 but who have not yet made a service request).

In determining the provisioning level output 253, the PLD component 250 may utilize historical trip data, such as provided from trip data store 255. The trip data store 255 may identify, for example, the number of requesters that have historically been present in a given subregion over a comparative time period. Likewise, the trip data store 255 may identify the number of service providers which have historically been available in or near a given subregion. The data service store 230 may also provide inputs from the current state of the geographic region for use in forecasting. Such inputs may include a current number of service vehicles (e.g., active (e.g., on-duty) service providers), a current number of requesters, and the current location or sub-region of the currently active service providers and/or requesters. In some examples, the PLD component 250 can extrapolate or model a current projection of the provisioning level for a future time interval in each of multiple sub-regions of a given geographic region, using the historical trip data 255 and inputs determined from the data service store 230 regarding the current numbers of service providers (or their respective vehicles) and requesters (e.g., including users who have open service requests, as well as users who have opened the service application 218 on their respective mobile device 204 but have not yet generated a service request). In determining a current forecast of the provisioning level for a future time interval, the PLD component 250 may forecast the quantity of service vehicles for the future time interval, based on the current number of service vehicles and the historical trip data 255. The PLD component 250 may also forecast the quantity of requesters, based on the current number of requesters and the historical trip data 255.

In some examples, the provisioning level output 253 may be represented as a score for individual subregions, where the score is based on the ratio of service providers and requesters. A map data store 266 may store the provisioning level output 253 (e.g., as a score) for individual subregions. In this way, the provisioning level output 253 may reflect oversupply or undersupply of service providers in specific subregions.

The PLD component 250 may determine the provisioning level output 253 for a current time interval. In variations, the PLD component 250 may determine the provisioning level output 253 as a forecast for a future time interval. The future time interval may extend from the current time to a future time (e.g., for X minutes in the future). Alternatively, the future time interval may correspond to a time interval that starts and ends in the future (e.g., between 12-1 pm each day). The PLD component 250 can repeat determination of the provisioning level output 253 at the current time interval and/or as a forecast for the future time interval.

In some examples, the counter logic 264 may be utilized to convert the provisioning level output 253 of the map data store 266 to tally rates 265 for individual subregions. The tally rates 265 determine an increment and/or frequency of incrementing for the counter value 262 for a subregion, with a higher tally rate 265 coinciding with increased counter values 262. The counter logic 264 may determine tally rates 265 to reflect the level of provisioning, such that a degree of undersupply of service providers relates to a higher tally rate 265.

In variations, the counter manager 260 can calculate the counter value 262 based on the current location 207 of the service provider. In one implementation, the counter manager 260 references the current location 207 of the service provider with the map data store 266 to determine the tally rate 265. Once the counter manager 260 initiates the counter value 262 (e.g., upon the service provider entering the unmatched state), the counter manager 260 tallies the counter value 262 based on events or conditions, such as the passage of time while the service provider is in the unmatched state. Additionally, the counter manager 260 monitors the service data store 230 (or other data sources, such as the mobile device 202 of the service provider, or the mobile device 204 of the requester) for a condition or event that affects the tallying of the counter value. In one implementation, the counter manager 260 (i) pauses the counter value 262 when the matching component 240 matches the service provider to a service request, and (ii) converts the counter value 262 to a conversion or account value 267 (e.g., account credit) when the service provider completes the service request (e.g., as indicated by the service state store 230).

The provider communication component 270 can use the current location 207 of the provider to generate a query 259 for tally values 265 for multiple sub-regions that are in a vicinity of the current location. The communication component 270 can obtain a set of tally values 265 which are each associated with a corresponding geographic data point. one or more types of communications 257 for the mobile device 202 of the provider which identifies the current tally rate 265 for the service provider, based on the current location of the service provider. Additionally, the provider communication component 270 can indicate the tally rate 265 of surrounding areas of the service provider. In this way, the communications 257 can cause service providers to operate their vehicles in directions where service providers are more likely to be needed. By way of examples, the communications 257 can be in the form of messages (e.g., in app messages or pushed content), notifications or alerts, and the content of the communications can specify a particular location, subregion or direction of travel. In some examples, the communications 257 can be in the form of non-textual alerts, such as audibles, lighting effects or other audiovisual output which serve as a hint or indirect communication regarding a particular road, direction or action a service provider should take. According to some examples, the communications 257 can be in the form of markers or indicators for map content which is displayed on the service application 216 of the individual service providers. In one implementation, the service application 216 of the service provider may render directional indicators, such as arrows, visual gradients or audibles, in connection with map or navigation content.

According to some examples, the counter manager 260 can distribute the credit 267 (or portion thereof) as part of the fare value 275 which is charged to the requester, and used to compensate the service provider. For example, the fare value 275 can be based on fare components such as distance traveled, geographical boundaries crossed (e.g., geo-fenced perimeters traversed by a vehicle), duration of trip and/or market conditions (e.g., ratio of service vehicles to requesters). In some variations, the components of the fare value 275 may include a portion that is attributable to the credit 267, as determined from the counter value 262. In this way, some variations provide that the system 200 can use the counter value 262 as a mechanism to at least partially account for the provisioning level (e.g., oversupply or undersupply of service providers and vehicles). By way of example, the tallying of the counter value 262 for a service provider may be paused by upon the service provider accepting a service request. Upon the service provider completing the service request, the counter value 262 may be converted in whole or in part into the credit 267 and then added to the fare value 275, as determined by the fare calculation component 276.

In some variations in which the credit 267 provided by the counter value 262 is added to the fare value 275, the service provider may have ability to reduce, or otherwise decline to add the credit 267 to the fare value 275. For example, the service provider may elect to reduce or eliminate the credit 267 by, for example, specifying a setting or other input through the service application 216 before, or at the time when the service request is received. In such variations, the service provider can make the election to reduce or eliminate the credit 267 from the fare value 275, in order to, for example, increase the chances that the service provider will more quickly be matched to a service request.

In other variations, the service provider can use the credit 267 to set a bid price for services from requesters. For example, the service provider may know that the credit value 267 will be applied to the service provider's account upon the service provider completing the next service request. Based on such assurances, the service provider may seek a higher value fare (e.g., specify a request for matching to high-value fare) based on the assumption that the service provider will at minimum receive a new fare at which time the service provider will be able to collect the credit 267.

As an alternative or variation, the counter manager 260 can aggregate counter values for service providers in given geographic regions, and then use the aggregated value to determine an adjustment to the fare value 275. For example, for each service request that is initiated in a given subregion, the fare value 275 may be adjusted an amount that is based on an aggregation of the counter values 262 for all of the available vehicles in that subregion. In particular, the fare value 275 can include an adjustment that is based on an aggregation of the counter values 262 and a number of requesters that are determined and/or projected to be present in the given subregion. The determination of the number of requesters can include, for example, a real-time estimation and/or projection of the number requesters who have opened the service application 218 but who have yet to generate a service request, as well as requesters who have unmatched or open service requests.

While some examples are described which provide for tallying the counter value 262 based on milestones related to when a service provider is in an unmatched state, in variations, one or more additional counters may be separately initiated and tallied in connection with alternative milestones. For example, the counter manager 260 may operate multiple counters that are triggered to initiate and end to different milestones 235. In some implementations, the counter manager 260 can maintain multiple separate or independent counters concurrently and/or consecutively for a given service vehicle. The counter logic 264 can include rules, settings or other logic to define milestones 235 to initiate and terminate individual counters, as well as to set initial counter values and tally rates. In this way, the manner in which the individual counters tally over time, as well as the milestones 235 which initiate and terminate the respective milestones, may be set to reward or influence actions of the service providers.

In an example, the counter manager 260 can initiate a second on-route counter in response to detecting a first milestone 235 that corresponds to a service provider receiving or accepting a service request. In one implementation, the counter manager 260 tallies the on-route counter while the service provider is deemed to progress towards the service location. The tally rate of the counter value 262 for the on-route counter may vary based on factors such as (i) whether the service provider follows or deviates from an optimal route to the service start location, and/or (ii) the time needed by the service provider to reach the service start location. For example, the tally rate may lessen or cease altogether if the service provider is deemed to take a circuitous route, or if the service provider is deemed to drive too fast. However, the tally rate may increase at an optimal rate for the service provider if the service provider progresses to the service location along a recommended route at an appropriate pace.

As an addition or variation, the counter manager 260 may implement a counter that tallies to reward the service provider for maintaining a recommended route to the destination of a service request. For example, an on-trip counter (e.g., initiates upon the service provider picking up the requester) can be set to have a higher tally rate when the service provider operates the vehicle in accordance with a pre-selected route. In this way, the system 200 can influence the selection of routes by service providers.

As an addition or alternative, the counter logic 264 can include rules or conditions for the counter manager 260 to implement a negative counter. For example, a negative counter may start the service provider at a high value, and then detract from the high value based on a negative tally rate, and/or based on the occurrence of unwanted negative events or conditions. A negative counter may be used to implement, for example, an on-route counter (e.g., counter that tallies at a negative rate) in order to influence a route driven and/or responsiveness of the responding service provider in reaching the start location. By way of example, the responsiveness may be measured as a time interval starting from when service provider accepts service request and ending when (i) the service provider is deemed to start to move towards the service start location, and/or (ii) the service provider arrives at the service start location.

While the counter manager 260 may implement counters to reward service providers for responsiveness and timeliness, in some examples, bad driving habits, such as speeding, or using a mobile device while driving, can be detected through monitoring operations performed by the service application 216 and/or the system 200. For example, the system 200 can monitor the updated current location of the service provider to detect when the service provider is operating the service vehicle at an unsafe speed. When such an unwanted driving characteristic is detected, a corresponding counter may be negatively tallied or reduced to the detriment of the service provider. For example, if the service provider is deemed to speed to the service start location, the on-route counter may reset or tally negatively.

Methodology

Figure 3:
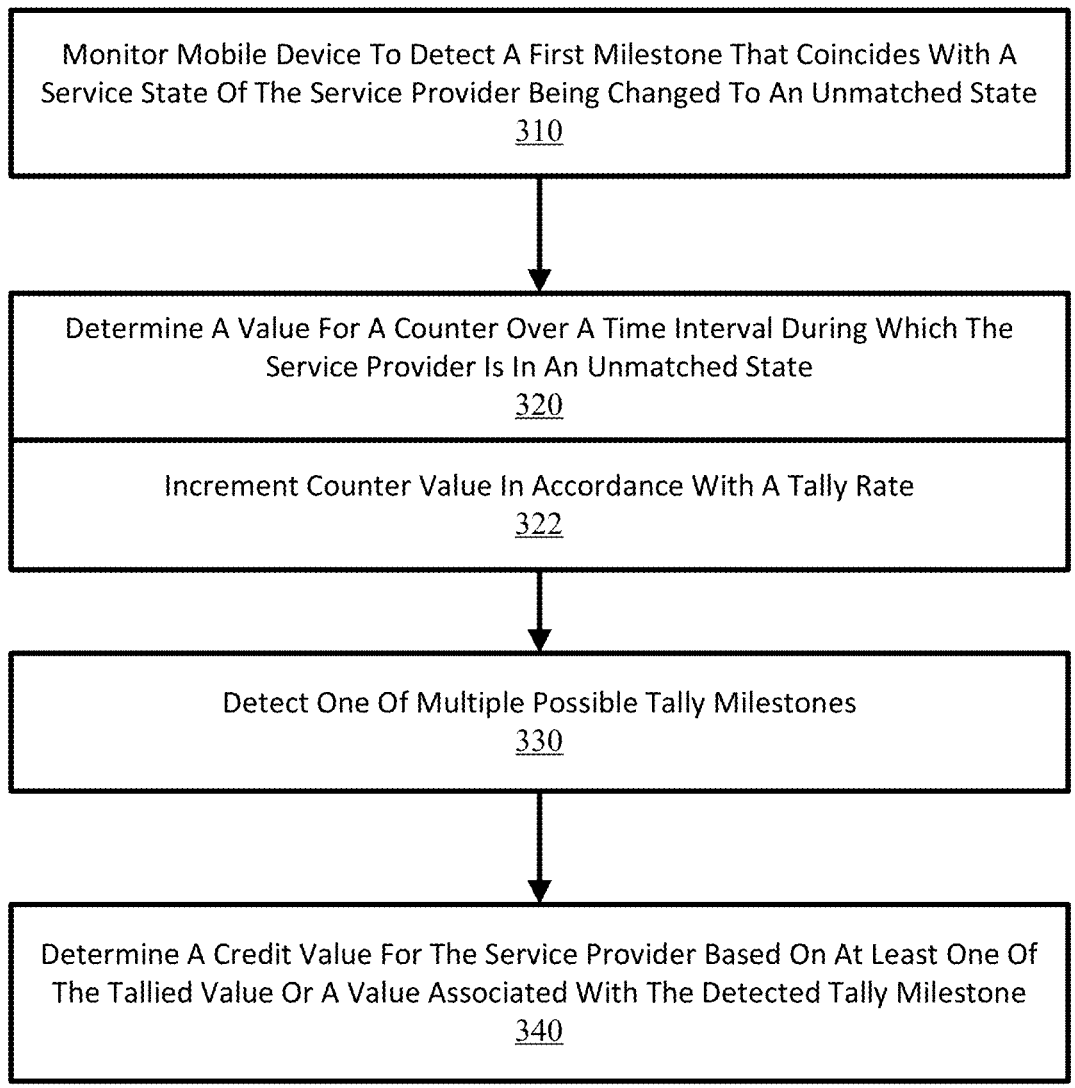
FIG. 3 illustrates an example method for determining a counter value for a service provider.
Figure 4:
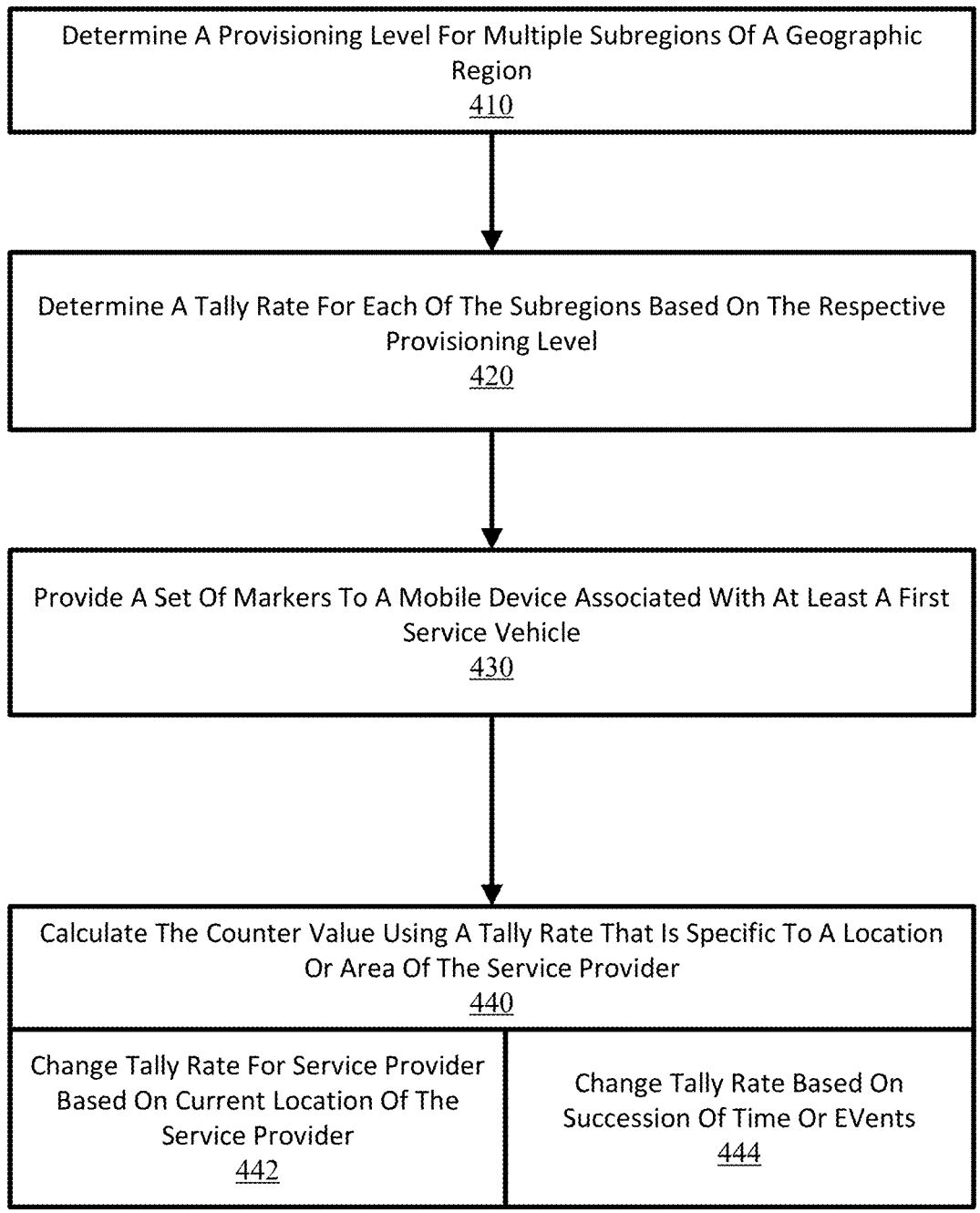
FIG. 4 illustrates an example method for providing a transport-related arrangement service using counter values.

FIG. 3 illustrates an example method for determining a counter value for a service provider. FIG. 4 illustrates an example method for providing a transport-related arrangement service using counter values. In describing an example of FIG. 3, reference may be made to elements described with other figures for purpose of illustrating a suitable component or element for performing a step or sub-step being described.

With reference to FIG. 3, the system 200 can monitor an activity of a service provider to detect a first milestone that coincides with a service state of the service provider being changed to an unmatched state (310). In the unmatched state, the service provider is not obligated to operate the service vehicle in furtherance of a service request. In one implementation, system 200 detects the first milestone by, for example, monitoring operations performed through the service application 216 of the service provider's mobile device. For example, the service provider's mobile device can be monitored for the current location and/or input that sets the service state of the service provider. In other variations, the service state store 230 can be tracked to detect when the service provider changes to the unmatched state. The counter for the service provider in the unmatched state can, depending on implementation, initiate immediately upon the service state being detected to be unmatched, or a designated duration after when the service state is detected to be in the unmatched state.

The system 200 may determine the counter value 262 for the counter over a time interval during which the service provider is in the unmatched state (320). In some examples, the counter value may be tallied from an initial value, and incremented in accordance with a tally rate (322). The tally rate may set the increment size and/or frequency of increments. By way of example, the tally rate may increment the counter value 262 based on passage of time (e.g., every 5 seconds) and/or distance traveled (e.g., every kilometer).

The system 200 may detect a second one of multiple possible second milestones (330). The second milestones of the counter can determine whether the corresponding counter is paused, terminated without completion (e.g., reset), or completed (e.g., converted into the conversion value 267). The second milestone may correspond to a pre-determined event or condition which the service provider may detect, for example, one or more service states which follow the unmatched state for the service provider. For example, the service provider may switch from the unmatched state to an offline state, in which case the milestone may correspond to the occurrence of the service provider being in the offline state. Alternatively, the system 200 may track the service provider with respect to a service request, with the monitored actions reflecting a changed service state of the service provider. For example, the service provider may accept a service request, travel towards a service location, initiate performance to fulfill the service request (e.g., pick up a requester), and complete the service request (e.g., take passenger to destination). Each event may correspond to a change in the service state of the service provider. In variations, one or more of the events may correspond to a predefined milestone wherein the counter value is converted to an initial value.

The system 200 may determine a credit value for the service provider based on at least one of the tallied value, or a value associated with the detected milestone (340). In an implementation, the detected milestone may correspond to the service provider going offline (e.g., before a service request is assigned to the service provider). The particular event may trigger a counter value reset, resulting in a zero (or minimum credit value). In variations, the milestone may correspond to a service state change, or to an event that signifies a service state change where the service provider is assigned to, initiates or completes a service request. In such cases, the counter value may be converted to a credit value, and then reset. The credit value may be stored or associated with the user's account.

With reference to an example of FIG. 4, the system 200 determines a provisioning level for each of multiple subregions in a geographic region (410). The provisioning level can be based on an estimate of a quantity of a plurality of service vehicles operating in a geographic region during a given time interval. For the given time interval, the system 200 may determine a provisioning level for a service provided by the projected quantity of service vehicles in each of multiple subregions of the geographic region.

The system 200 determines a tally rate for each of multiple subregions, where the tally rate is based at least in part on the provisioning level of the respective subregion (420). For example, a subregion or area with the greatest disproportion between service providers and requesters may have the highest tally rate. As such, the service provider who travels towards the subregion may accumulate the counter value at a faster rate (as compared to a service provider going to a well-provisioned sub-region).

The system 200 provides a set of markers to the mobile device that is associated with at least a first service vehicle, where the service markers indicate the tally rate for each of multiple subregions (430). The markers may appear as part of map content, and such as in the form of highlights, directional indicators (e.g., arrows), colored or shaded map cells, or other indicia which indicate a target direction of travel or area for the service provider to obtain a high tally rate. The system 200 may also generate markers or indicators to indicate a relative value for the tally rate.

The system 200 may calculate the counter value using a tally rate that is based on a specific location or area of the service provider (440). Thus, for example, the service provider may tally the counter value at different rates depending on the location and/or direction of travel of the service provider (442). In some examples, the counter value may convert to credit for the provider's account once the service provider performs a designated action, such as accepting or completing a service request.

Additionally, in some examples, the tally rate may be changed in connection with a succession of time or events which are linked to a milestone or other event (444). For example, the tally rate may be progressively increased based on, for example, a succession of time during which the service provider is on-duty. Alternatively, the tally rate may be increased based on a duration of an unmatched state, or to the consecutive number of service assignments which the service provider accepted.

Example User-Interface for Using Counter Values

FIG. 5A through FIG. 5D illustrate example user interfaces on which a counter value is provided. In particular, a user interface 500 may be generated and displayed on a mobile device 502 of a service provider, in order to enable use of a counter value 510 in connection with determinations of provisioning levels throughout different subregions which surround the current location of a service vehicle.

Figure 5A:
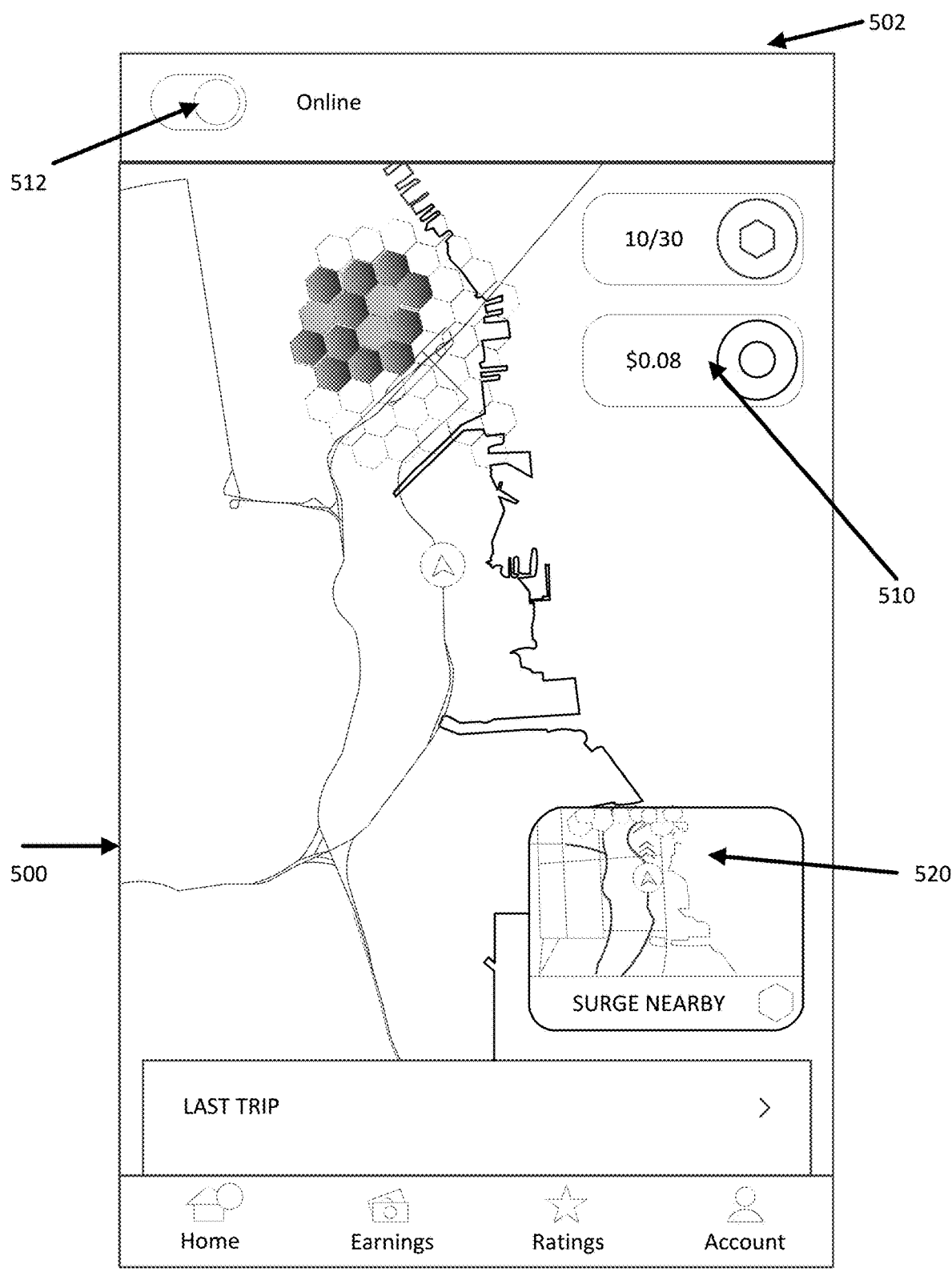
FIG. 5A through FIG. 5D illustrate example user interfaces on which a counter value is provided.

In FIG. 5A, an online feature 512 may be provided on a user interface 500 of a service provider's mobile device 502. The user may interact with the online feature 512 to transition the service provider to an online and unmatched state. While in the unmatched state, a counter value 510 is displayed. The counter value 510 may increase based on a tally rate. As described with other examples, the tally rate may be determined from the current location of the service vehicle. The user interface 500 displays subregions 508 which are shaded, marked or color-coded to reflect a corresponding provisioning level (e.g., darker cells reflect subregions where provisioning level indicates greatest need for service provider). In some examples, a separate map content feature 520 may also display a proximate subregion where the provisioning level is high.

Figure 5B:
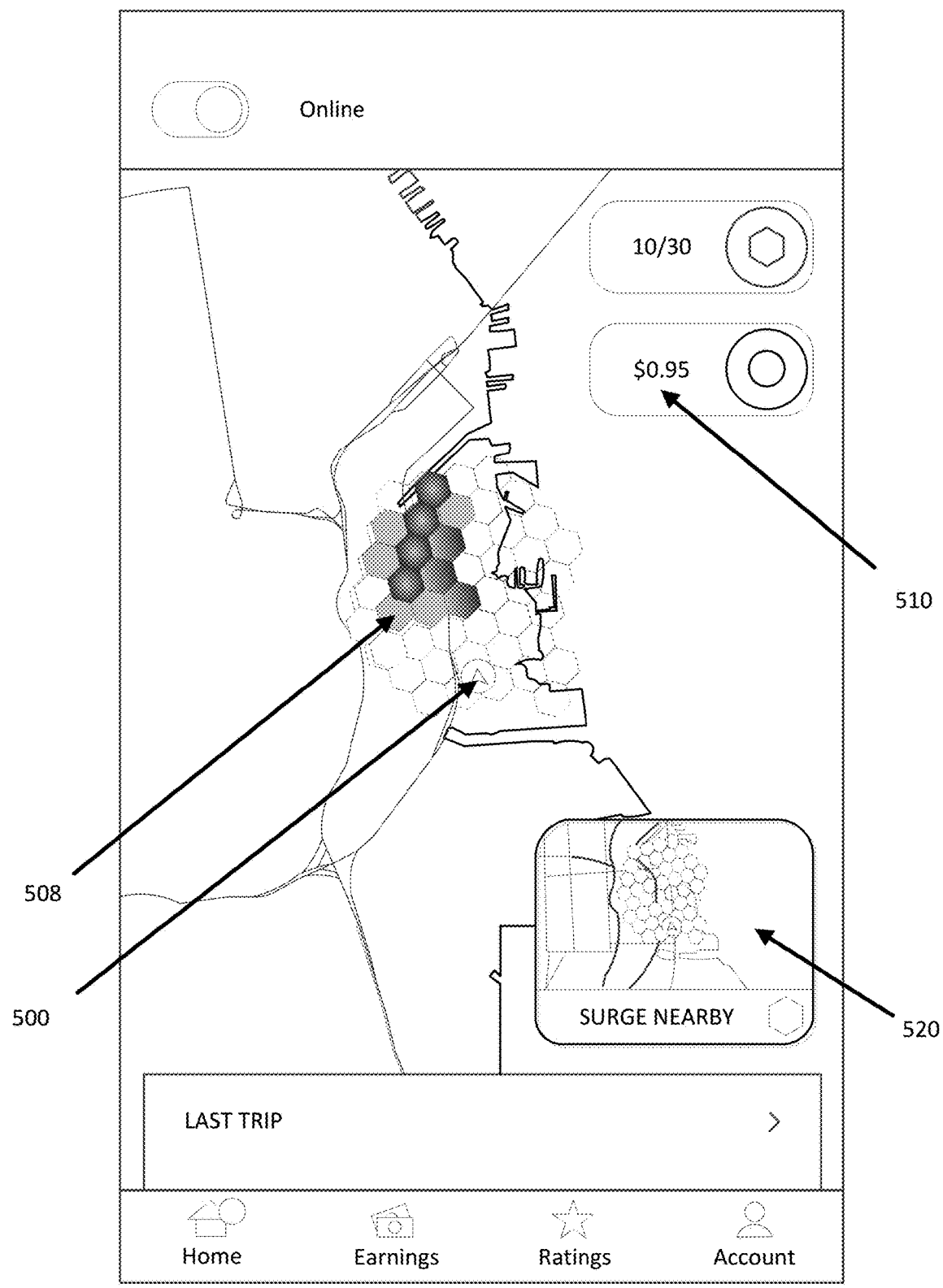
Figure 5C:
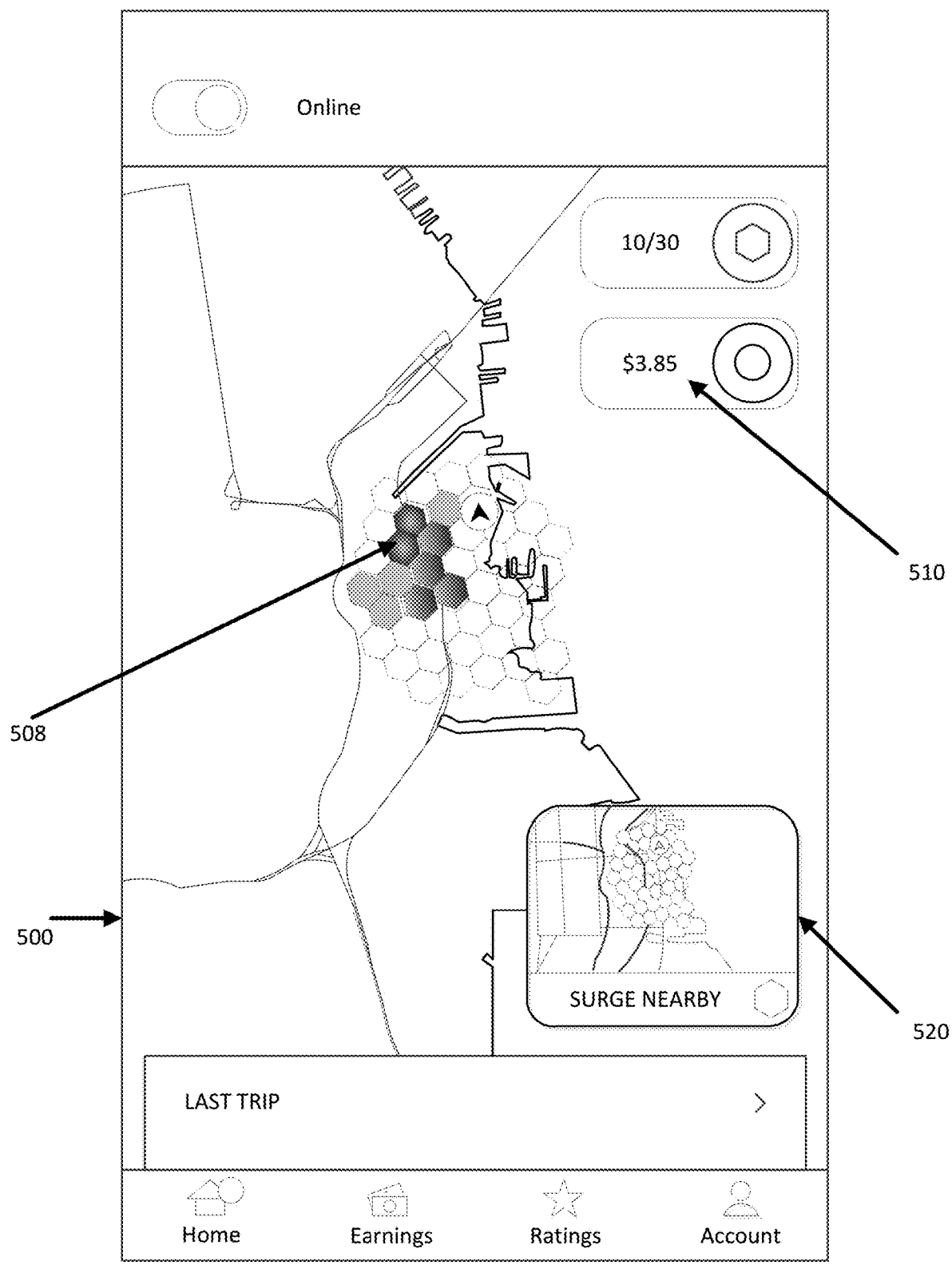

In FIG. 5B and FIG. 5C, the counter value 510 is shown to increase, reflecting the service provider continuing to be in the off-service state.

Figure 5D:
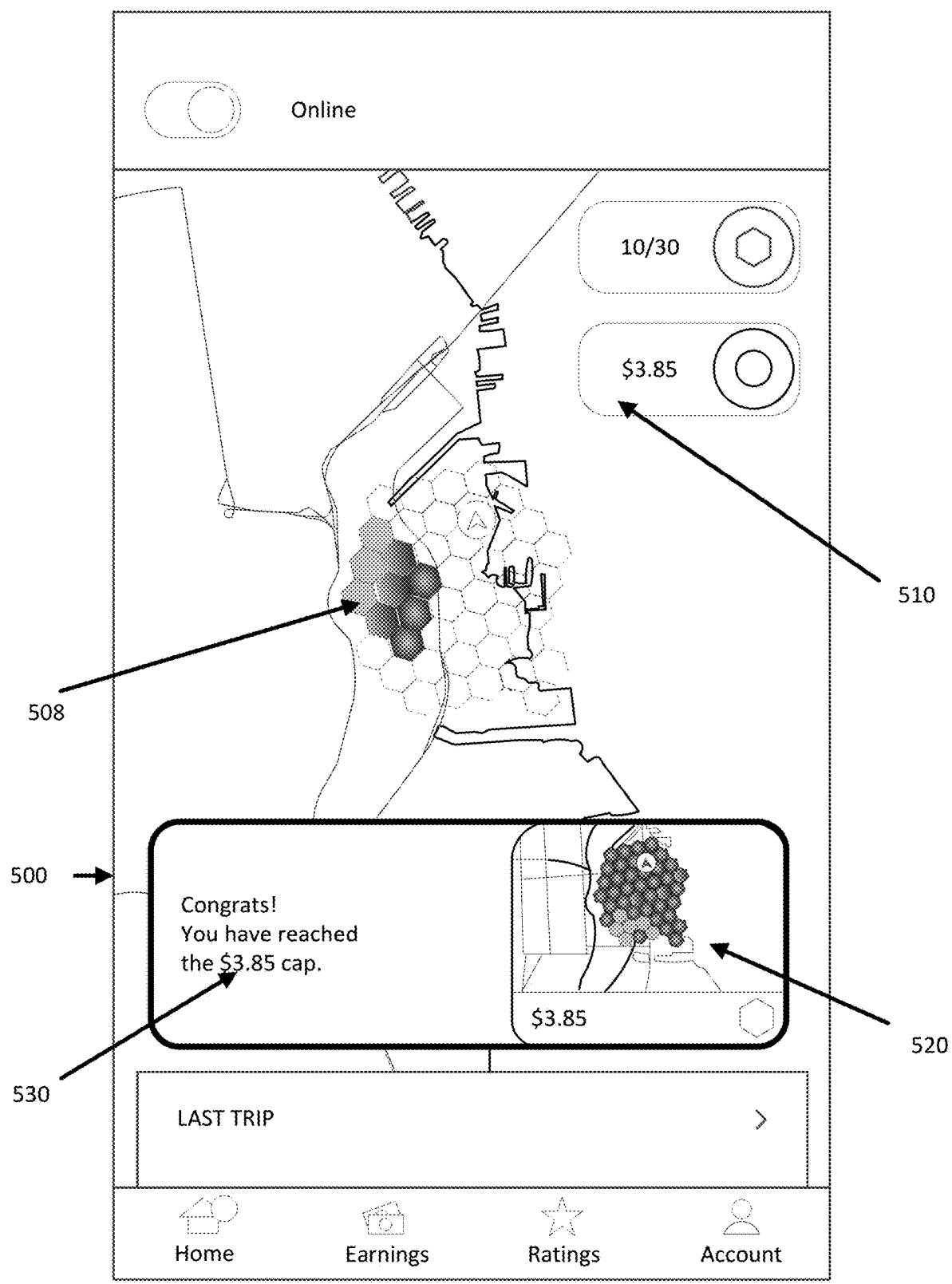

In FIG. 5D, a milestone event is shown which limits the counter value 510. In an example, the milestone event corresponds to the counter value reaching a maximum value. A message 530 or other feature may be displayed to the service provider indicating the milestone event.

Hardware Diagram

Figure 6:
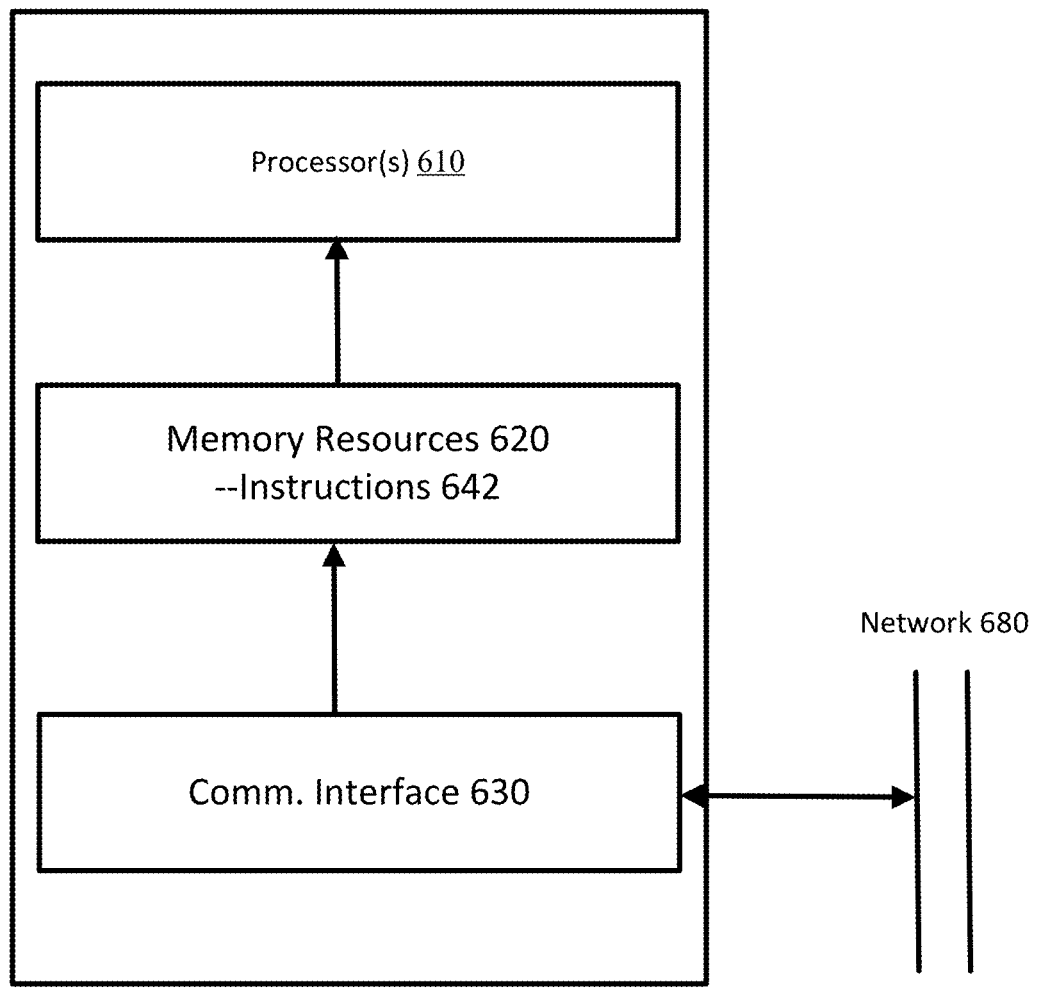
FIG. 6 is a block diagram that illustrates a computer system upon which one or more embodiments described herein may be implemented.

FIG. 6 is a block diagram that illustrates a computer system upon which one or more embodiments described herein may be implemented. For example, in the context of FIG. 1 and FIG. 2, the network computer system 100 and service arrangement system 200 may be implemented using a computer system or combination of computer systems, such as described by FIG. 6.

In one implementation, the computer system 600 includes one or more processors 610, memory resources 620, and a communication interface 630. The computer system 600 includes at least one processor 610 for processing information. The memory resources 620 may include a random access memory (RAM) or other dynamic storage device, for storing information and instructions to be executed by the processor(s) 610. The memory resources 620 also may be used for storing temporary variables or other intermediate information during execution of instructions to be executed by the processor(s) 610. The computer system 600 may also include other forms of memory resources, such as static storage devices for storing static information and instructions for the processor 610. The memory resources 620 can store information and instructions, including instructions 642 for (i) determining provisioning levels for specific geographic subregions, and/or (ii) calculating a counter value that is specific to individual subregions of the geographic region. The instructions 642 may be used to implement, for example, the service arrangement system 200. Additionally, the processor(s) 610 can execute the instructions 642 to implement a method such as described with an example of FIG. 3 or FIG. 4.

The communication interface 630 can enable the computer system 600 to communicate with one or more networks 480 (e.g., cellular network) through use of the network link (wireless or wireline). Using the network link, the computer system 600 can communicate with one or more other computing devices and/or one or more other servers or data centers. In some variations, the computer system 600 can receive service requests from requester devices via the network link 680. Additionally, the computer system 600 can receive information from provider devices, from which forecasts of provisioning levels, location bias and other aspects described herein may be determined.

Examples described herein are related to the use of the computer system 600 for implementing the techniques described herein. According to one embodiment, those techniques are performed by the computer system 600 in response to the processor 610 executing one or more sequences of one or more instructions contained in the memory resource 620. Such instructions may be read into a main memory from another machine-readable medium, such as a storage device. Execution of the sequences of instructions contained in the main memory 620 causes the processor 610 to perform the process steps described herein. In alternative implementations, hard-wired circuitry may be used in place of or in combination with software instructions to implement examples described herein. Thus, the examples described are not limited to any specific combination of hardware circuitry and software.

Figure 7:
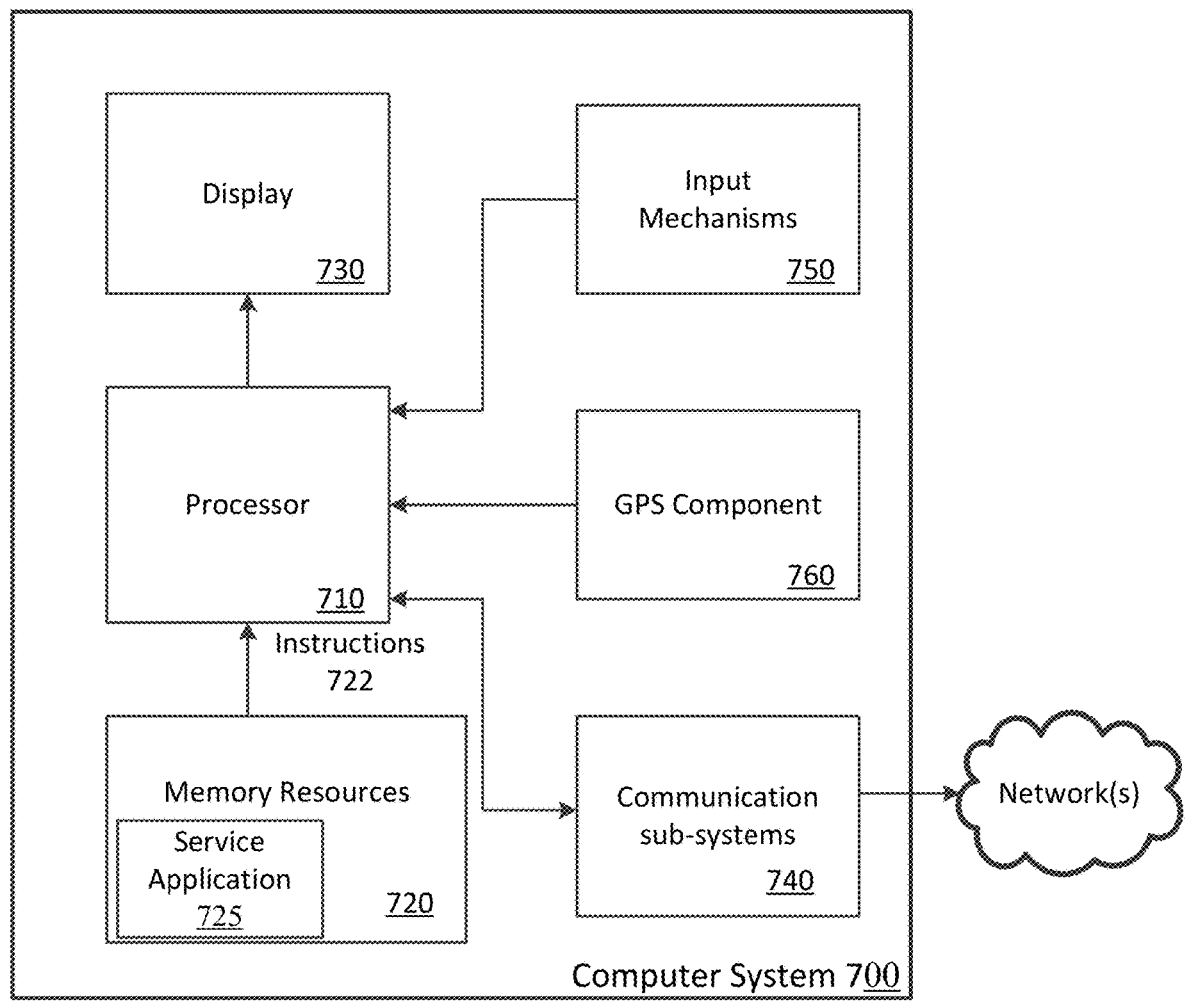
FIG. 7 is a block diagram that illustrates a computing device for use with some examples as described herein.

FIG. 7 is a block diagram that illustrates a computing device for use with some examples as described herein. In an implementation, a computing device 700 may correspond to a mobile computing device, such as a cellular device that is capable of telephony, messaging, and data services. The computing device 700 can correspond to a device operated by a service provider that includes location-based services (e.g., provider device 202 and requester device 204). Examples of such devices include smartphones, handsets, tablet devices, or in-vehicle computing devices that communicate with cellular carriers. The computing device 700 includes a processor 710, memory resources 720, a display device 730 (e.g., such as a touch-sensitive display device), one or more communication sub-systems 740 (including wireless communication sub-systems), one or more sensors 750 (e.g., accelerometer, gyroscope, barometer, altimeter, microphone, camera), and one or more location detection mechanisms (e.g., GPS component) 760. In one example, at least one of the communication sub-systems 740 sends and receives cellular data over data channels and voice channels. The communications sub-systems 740 can include a cellular transceiver and one or more short-range wireless transceivers. The processor 710 can exchange data with a service arrangement system (not illustrated in FIG. 7) via the communications sub-systems 740.

The memory resources 720 can store instructions for the service application 725. For example, the processor 710 is configured with software and/or other logic to perform one or more processes, steps, and other functions described with mobile computing devices of occupants of vehicles. In particular, the processor 710 can execute instructions and data stored in the memory resources 720 in order to execute a service application, such as described with various examples. In some examples, the processor 710 can execute instructions 722 to provide a variety of content to the display 730 by executing instructions stored in the memory resources 720. The content may include a user interface with map content and a counter value, such as described with examples of FIG. 1 and FIG. 2.

Moreover, while some examples recite logic for tallying counter values as residing on a computer system that is remote to the mobile device of the service provider, in variations, the logic and functionality (e.g., such as provided by counter manager 260 and counter logic 264) may reside in part or whole with the mobile device of the service provider. As such, the instructions 722 can, in some variations, perform functions described with service arrangement system 200, including tallying the counter value based on, for example, a duration of time or distance traveled between milestone events.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is claimed is:

1. A computer system comprising:
a memory to store instructions;
one or more processors to access the memory and execute the instructions, wherein the instructions, when executed by the one or more processors, cause the computer system to perform operations that include:
monitoring a service provider operating a service vehicle;
detecting, from monitoring the service provider, a first milestone that coincides with a service state of the service provider being changed to an unmatched state, wherein in the unmatched state, the service provider is not obligated to operate the service vehicle in furtherance of a service request;
determining, from monitoring the service provider, a current location of the service provider over a time interval in which the service provider operates the service vehicle while in the unmatched state;
at one or more instances during the time interval in which the service state of the service provider is in the unmatched state, determining a tally rate for the service provider based at least in part on the current location of the service provider, the determined tally rate identifying a corresponding increment value and a frequency by which the corresponding increment value is to be added to a value of a counter upon an occurrence of an event or condition;

repeatedly tallying the value of the counter using the identified increment value and frequency of the determined tally rate;

detecting a second milestone of multiple possible second milestones to terminate tallying of the value of the counter;

determining a credit value for the service provider based at least in part on the tallied value of the counter; and reset the counter to an initial value when the service provider goes offline.

2. The computer system of claim 1, wherein the tallied value of the counter is based at least in part on one or more determined tally rates and a duration of time between when the first and second milestones are detected.

3. The computer system of claim 1, wherein the tallied value of the counter is based at least in part on the determined tally rate and a distance the service provider travels while the service provider is in the unmatched state.

4. The computer system of claim 1, wherein the tallied value of the counter is based at least in part on a direction of travel of the service vehicle.

5. The computer system of claim 1, wherein detecting the second milestone includes detecting at least one of the service provider being assigned to a service request or the service provider completing a service request.

6. The computer system of claim 5, wherein the instructions, when executed by the one or more processors, cause the computer system to perform operations that include converting the tallied value of the counter to a credit value that is associated with an account of the service provider in response to detecting the service provider completing the service request.

7. The computer system of claim 6, wherein the instructions, when executed by the one or more processors, cause the computer system to perform operations that include associating the credit value with an account of the service provider.

8. The computer system of claim 7, wherein the instructions, when executed by the one or more processors, cause the computer system to perform operations that include detecting an event or condition to freeze the tallied value of the counter before determining the credit value.

9. The computer system of claim 8, wherein the condition or event to freeze the tallied value of the counter corresponds to the counter value reaching a maximum limit.

10. The computer system of claim 8, wherein the condition or event includes one of (i) the service provider being assigned to a service request, or (ii) the service provider completing a service request.

11. The computer system of claim 1, wherein detecting the second milestone includes detecting the service provider goes offline, and wherein determining the credit value includes determining the credit value to be null.

12. The computer system of claim 1, wherein implementing the tally rate includes using one or more rules to determine at least one of the increment value or the event or condition.

13. The computer system of claim 12, wherein the event or condition for the determined tally rate is based at least in part on a direction of travel of the service provider while the service provider is in the unmatched state.

14. The computer system of claim 13, wherein the determined tally rate is variable for the service provider.

15. The computer system of claim 14, wherein the increment value of the determined tally rate is based at least in part on the current location of the service provider.

16. The computer system of claim 14, wherein the determined tally rate is based at least in part on a consecutive duration in which the service provider is online.

17. The computer system of claim 14, wherein the determined tally rate is based at least in part on a provisioning level of a subregion of the service provider's current location.

18. The computer system of claim 1, wherein tallying the value of the counter includes detecting the service provider performing one or more actions that are defined by one or more rules, while operating a service vehicle in the unmatched state.

19. The computer system of claim 1, wherein the instructions, when executed by the one or more processors, cause the computer system to perform operations that include:

displaying the tallied value of the counter to the service provider; and displaying an alert to the service provider that indicates an action for the service provider to perform to maximize the tallied value of the counter.

20. The computer system of claim 19, wherein displaying the alert includes displaying a directional indicator to indicate a direction of travel for the service provider to maximize the tallied value of the counter.

21. The computer system of claim 1, wherein tallying the value of the counter includes increasing the value of the counter only when the service provider travels in a target direction or towards a target area.

22. The computer system of claim 21, wherein the instructions, when executed by the one or more processors, cause the computer system to perform operations that include:

determining a provisioning level for a service provided by a projected quantity of service vehicles in each of multiple subregions of a geographic region; and determining the tally rate for the service provider based in part on a current location of the service vehicle, a direction of travel, and the provisioning level of one or more sub-regions which are in a direction of travel.

23. The computer system of claim 22, wherein determining the tally rate includes varying the tally rate based on whether the provisioning level of each of the multiple sub-regions which are in the direction of travel of the service provider being indicative of the subregion being oversupplied or undersupplied.

24. A method for managing services, the method being implemented by one or more processors and comprising:

monitoring a service provider operating a service vehicle;

detecting, from monitoring the service provider, a first milestone that coincides with a service state of the service provider being changed to an unmatched state, wherein in the unmatched state, the service provider is not obligated to operate the service vehicle in furtherance of a service request;

determining, from monitoring the service provider, a current location of the service provider over a time interval in which the service provider operates the service vehicle while in the unmatched state;

at one or more instances during the time interval in which the service state of the service provider is in the unmatched state, determining a tally rate for the service provider based at least in part on the current location of the service provider, the determined tally rate identifying a corresponding increment value and a frequency by which the corresponding increment value is to be added to a value of a counter upon an occurrence of an event or condition;

repeatedly tallying the value of the counter using the identified increment value and frequency of the determined tally rate;

detecting a second milestone of multiple possible second milestones to terminate tallying of the value of the counter;

determining a credit value for the service provider based at least in part on the tallied value of the counter; and resetting the counter to an initial value when the service provider goes offline.

* * * * *